(No Model.)

W. E. ELLIOTT.
ANTI FRICTION JOURNAL BEARING.

No. 391,234. Patented Oct. 16, 1888.

Witnesses.

Will P. Onohundro.
Geo. W. Bancroft.

Inventor.

William E. Elliott.
By Jno. G. Elliott.
Atty.

United States Patent Office.

WILLIAM E. ELLIOTT, OF CHICAGO, ILLINOIS, ASSIGNOR OF THREE-FOURTHS TO JAMES R. LANE, OF SAME PLACE.

ANTI-FRICTION JOURNAL-BEARING.

SPECIFICATION forming part of Letters Patent No. 391,234, dated October 16, 1888.

Application filed March 6, 1888. Serial No. 266,303. (No model.)

*To all whom it may concern:*

Be it known that I, WILLIAM E. ELLIOTT, a citizen of the United States, residing in the city of Chicago, in the county of Cook and State of Illinois, have invented certain new and useful Improvements in Anti-Friction Journal-Bearings, of which the following is a specification.

This invention relates to improvements in journal-bearings in which the journal is surrounded by a series of anti-friction cylinders or balls separated from those next in advance of the other by cylinders free to revolve upon their own axes and about the axis of the journal.

The object of this invention is to practically destroy friction between the separating-cylinders and the journal-bearing anti-friction cylinders or other devices, whereby the friction upon the journal by said cylinders or other devices is reduced to a minimum.

A further object is to have the separating-cylinders so arranged relative to the journal-bearing cylinders that said separating-cylinders shall have an axial rotation in the same direction as the journal during their translation around the journal, whereby said separating-cylinders offer no opposition to the rotation of the journal-bearing cylinders and have a positive and forward movement in fixed bearings during their rotation about the axis of the journal.

These objects are attained by devices illustrated in the accompanying drawings, in which—

Figure 1:
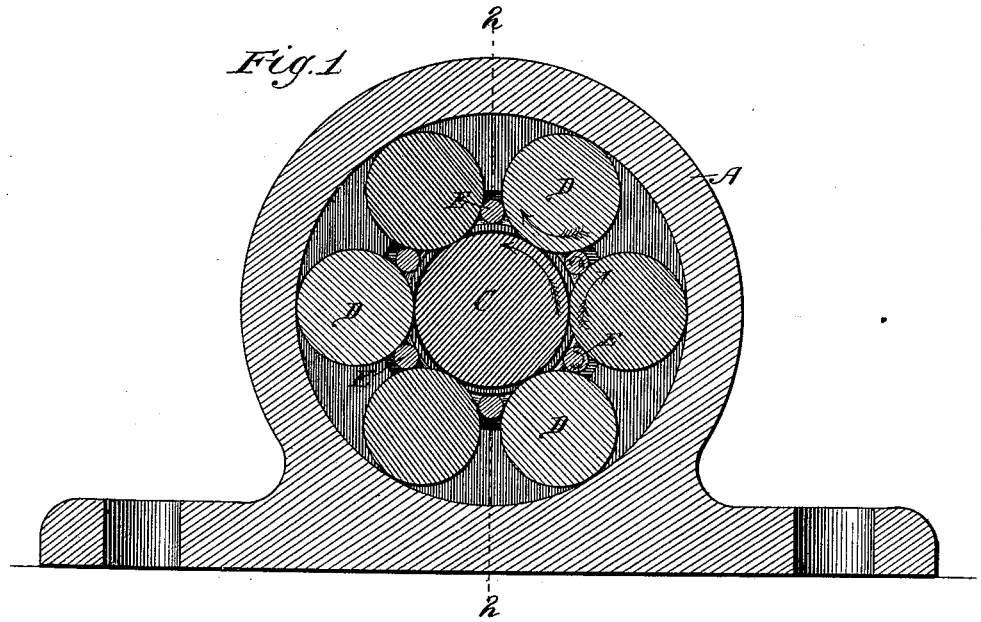
Figure 2:
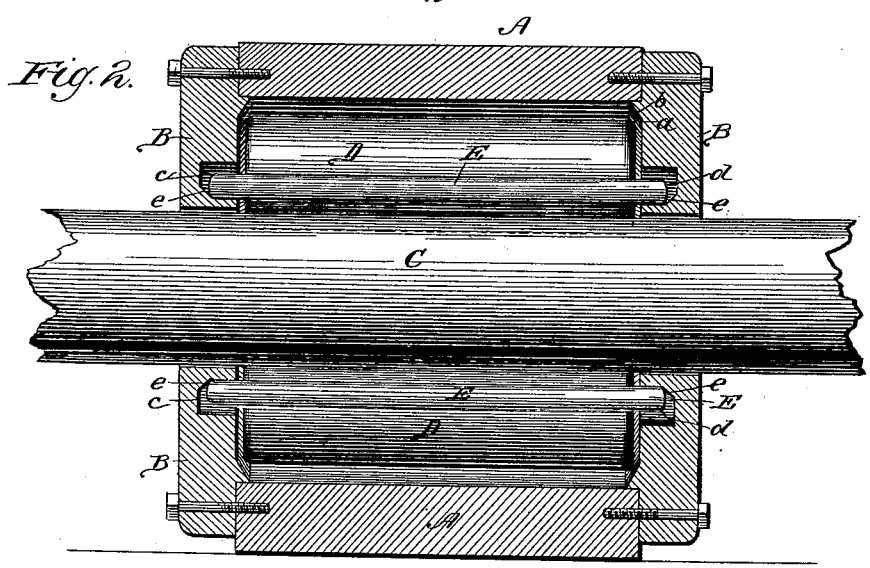

Figure 1 illustrates a transverse section through a journal-bearing embodying my invention; Fig. 2, a longitudinal section of the same on the line 2 2 of Fig. 1.

Similar letters of reference indicate the same parts in the several figures of the drawings.

In carrying out this invention a box or case, A, having a cylindrical bore and provided with removable heads B, is employed; but one of said heads may, if desired, be integral with the body of the box. The journal or shaft C has no bearing against the walls of said openings in said heads, but is supported by a series of cylinders, D, which also bear against the cylindrical wall of the body of the box, and are not only free to revolve upon their own axes, but about the axis of the journal. The anti-friction cylinders D are somewhat shorter than the internal length of the box, and have the corners of their ends slightly rounded, as shown at *a*, which rounded corners are opposed by and have their bearing against beveled or inclined faces *b*. (Shown formed with the heads B, but may project from the body of the box.) The effect of these rounded corners opposing the beveled bearings is not only to maintain the cylinders from an end bearing against the box, and thereby correspondingly reduce friction, but to maintain said cylinders in perfect alignment and bearing throughout their length against the journal, for in practice whenever there is any tendency of an end movement of the cylinders in one direction there must be an effort to ride up or down, as the case may be, on the inclined bearing, and any such effort will, as is obvious, be counteracted by the opposing inclined bearing, and hence the cylinders are maintained in perfect alignment with the bearing. Furthermore, by such inclined bearings and by rounding the corners of the cylinders the friction at the ends of said cylinders is reduced to a minimum, as is obvious, by the opposing of a curved surface to an angular surface in a structure of this character.

Cylinders D practically surround the journal, and simultaneously bearing, as they do, both against the journal and the cylindrical wall of the box are therefore the bearing proper of the journal, and when so simultaneously bearing against the journal and the fixed walls of the box the said cylinders rotate and travel on said walls with and in the same direction as the journal which causes their revolution, and in so doing there is practically no friction between the cylinders and said walls and between the cylinders and the journal. Unless, however, these cylinders are separated from each other, preferably either by cylinders or balls, they exert between each other an objectionable friction; and my invention or discovery is that when such separating devices, whether balls or cylinders, be arranged in contact with the cylinders at such a point that the bearings of said separating devices shall be between the circle of the axes of rotation of the cylinder and the surface of the journal without contact with the journal, said separating devices will be revolved on their own axes by the cylinders, and so that they will have a positive forward travel on their own bearings during their translation about the journal, and as a result practically offer no frictional resistance to the journal or the cylinders, but, on the contrary, substantially reduce the friction of the journal.

While balls may be employed, cylinders are preferred in carrying out my invention, and to this end a series of separating cylinders, E, are employed, the bearings of which are formed by the walls of annular grooves in the heads of the journal-box at a point between the periphery of the journal and the circle about which the cylinders D rotate around the journal; but this annular groove may be at any other point so long as the axes of the separating cylinders are within the circle above which the journal-bearing cylinders travel in their rotation about the journal. As shown, however, the diameter of the separating-cylinders are much less than the outer cylinders, and therefore said separating-cylinders are entirely within the circle about which the axes of said outer cylinders travel; but in this connection it should be understood that for the purposes of my invention the separating-cylinders should be entirely free from contact with the journal. The inner and separating cylinders preferably have rounded corners $d$, similar to those of the outer cylinders, and so, also, the inner end of their bearing is inclined, so that, like the outer cylinders, the ends of said inner cylinders shall be maintained from contact with the ends of the box and in parallelism both with their bearing-surface and the outer cylinders. In this connection, however, it should be understood that these details of construction are no limitation upon the broad idea of my invention, and may therefore be omitted without any departure from my invention.

While this invention has been described in connection with the journal-bearing, it should be observed that it is equally applicable to shafts of any character, and also to pulleys, and my invention is therefore not limited to the application thereof shown and before described.

Having described my invention, what I claim, and desire to secure by Letters Patent, is—

1. The combination of a box provided with an inclined bearing-face, a series of journal-bearing cylinders having rounded ends opposing said inclined bearings, and a series of separating-cylinders having no contact with the journal and their axes within the circle of the axes of rotation of the journal-bearing cylinders about the journal, substantially as described.

2. The combination of a box, a series of journal-bearing cylinders having their bearing on the box, and a series of separating-cylinders, the axes of which are within the circle of the axes of rotation of the journal-bearing cylinders, said separating-cylinders being provided with rounded ends, and their bearing in the box with an incline opposing said ends, substantially as described.

3. The combination of the box, the journal, and the journal-bearing cylinders in contact with said box, said journal-bearing cylinders having rounded ends, and their bearings in the box inclines opposing said ends, and a series of separating-cylinders having their axes within the circle of the axes of rotation of the journal-bearing cylinders, and having no contact with the journal, said separating-cylinders being provided with rounded ends, and their bearings in the box with inclines opposing said ends, substantially as described.

WILLIAM E. ELLIOTT.

Witnesses:
WILL R. OMOHUNDRO,
ALBERT M. BENNETT.